United States Patent
Chitsazan et al.

(10) Patent No.: US 6,531,848 B1
(45) Date of Patent: Mar. 11, 2003

(54) BATTERY VOLTAGE REGULATION CIRCUIT

(75) Inventors: Ehsan Chitsazan, Cumming, GA (US); Joey Goodroe, Dacula, GA (US)

(73) Assignee: Arris International, Inc., Duluth, GA (US)

( * ) Notice: Subject to any disclaimer, the term of this patent is extended or adjusted under 35 U.S.C. 154(b) by 112 days.

(21) Appl. No.: 09/866,453

(22) Filed: May 25, 2001

Related U.S. Application Data

(60) Provisional application No. 60/207,673, filed on May 26, 2000.

(51) Int. Cl.[7] .................................................. H02J 7/16
(52) U.S. Cl. ...................................................... 320/153
(58) Field of Search ................................ 320/118, 119, 320/120, 127, 128, 130, 134, 150–153

(56) References Cited

U.S. PATENT DOCUMENTS

| | | | |
|---|---|---|---|
| 5,504,415 A | 4/1996 | Podrazhansky et al. | 320/118 |
| 5,694,023 A | 12/1997 | Podrazhansky et al. | 320/129 |
| 5,889,385 A | 3/1999 | Podrazhansky et al. | 320/130 |
| 6,160,379 A * | 12/2000 | Chalasani et al. | 320/119 |
| 6,307,349 B1 * | 10/2001 | Koenck et al. | 320/112 |

* cited by examiner

*Primary Examiner*—Michael Sherry
*Assistant Examiner*—Pia Tibbits

(57) ABSTRACT

A battery voltage regulation circuit is provided for regulation the charging voltage of a battery. The system of the present invention includes a battery charger and a plurality of series connected batteries. Each of the plurality of series connected batteries are connected in parallel with a battery voltage regulator circuit. Each battery voltage regulator identifies excess battery current by using a voltage temperature compensation factor to compare the voltage of a battery to a reference voltage. A battery bypass circuit is used to remove excess battery current from a battery bath. In addition to being used in conjunction with a plurality of series connected batteries, the present invention may be used with a single charging battery to achieve the same results.

13 Claims, 3 Drawing Sheets

BATTERY VOLTAGE REGULATION CIRCUIT

CROSS-REFERENCE TO RELATED APPLICATION

This application claims the benefit of U.S. Provisional Patent Application Ser. No. 60/207,673 filed May 26, 2000, entitled "BATTERY EQUALIZER CIRCUIT."

TECHNICAL FIELD

The present invention relates to battery charger circuits and, more specifically, to a battery voltage regulator for regulating the voltage across each of a plurality of series connected charging batteries.

BACKGROUND OF THE INVENTION

In order to obtain optimum life from lead-acid batteries, the batteries must be correctly charged. When one charger is used to charge a string of batteries in series, it is unlikely that all of that batteries will receive proper charging, even if all of the batteries are brand new. As a result, some batteries may receive insufficient charge while other receive excess charge. Both of these conditions cause the premature failure of the batteries.

Typically, in series battery string applications, the charger monitors total string voltage rather than individual battery voltages. Since the total string voltage is the sum of the ideal individual battery charging voltages, one battery may receive insufficient charge while another is overcharged. Both overcharging and undercharging, caused by high and low float voltages respectively, damage the batteries and decrease the battery's life. Overcharging produces excessive heat that can cause the battery plates within the cells to buckle and shed their active material. Undercharging causes unwanted chemicals to build up on the battery plates, reducing its capacity and effective life. Unlike NiCad batteries, lead-acid batteries require constant charging with a float voltage level specified by the manufacturer. To prevent the damage to the batteries, battery manufacturers typically recommend a charging voltage of 13.25 to 13.65 Volts at 25° C. However, except in the case of single-battery applications, this recommendation is rarely observed. To complicate matters, the requirements for a given battery also vary with temperature. For example, MK batteries recommends −16.2 mV adjustment to the float voltage for one °C. temperature change.

In a conventional battery charging circuit, a battery charger may be connected in series with a plurality of batteries. For example, consider three batteries, battery A, battery B, and battery C connected in series with a battery charger. In this example, a 41.1 V battery charger is intended to provide a float voltage of 13.7 V on each battery A, B, and C. When the charging cycle starts, a charge current is supplied to all of the discharged batteries in series. In constant voltage charging, the total string voltage is monitored to determine if all of the batteries have reached the required float voltage. In this example, the required float voltage for each battery is 13.7 V. The charging circuit will operate in float mode when total battery sting voltage is 41.1 V (3*13.7V). If the batteries have uneven float voltages, as is nearly always the case, then the batteries will not receive the proper charge. For example, battery A may have a float voltage of 13.9 V while battery B has a float voltage of 13.5 V, and battery C has a float voltage of 13.7 V. The total string voltage is still 41.1V, but only battery C is being properly charged. In this example, battery A is being overcharged and battery B is not receiving adequate charge. Overcharging produces excessive heat which can damage the battery. Undercharging causes unwanted chemical buildup. Both of these problems reduce the life of the battery. These problems are inherent to all chargers that do not monitor individual battery voltages.

Therefore, there is a need in the art for a system and a method for regulating the float voltage on each of a plurality of batteries during charging.

Additionally, there is a need in the art for a system and a method for compensating for temperature variations in charging batteries during charging.

OBJECTS OF THE INVENTION

An object of the present invention is to provide a system and method for regulating the float voltage on a plurality of batteries during charging.

Another object of the present invention is to provide a system and method for providing temperature compensation to charging batteries during charging.

SUMMARY OF THE INVENTION

The present invention overcomes the above-described problems in the prior art by providing a system and method for regulating the float voltage on each of a plurality of batteries during charging.

The present invention provides a system and method for charging series connected batteries. The system of the present invention includes a battery charger and a plurality of series connected batteries. Each of the plurality of series connected batteries is connected in parallel with a battery voltage regulation circuit. Each battery voltage regulation circuit comprises a temperature sense circuit, a voltage sense circuit, a reference voltage circuit, a voltage/temperature compensation combiner, and a battery bypass circuit. In addition to being used in conjunction with a plurality of series connected batteries, the present invention may be used with a single charging battery to achieve the same results. Such an implementation of the present invention may be used with a battery charger that is not able to accurately charge a single battery.

The temperature sense circuit receives a parameter correlated to the temperature of a battery and provides a voltage temperature compensation factor correlated to the parameter. The voltage sense circuit receives a parameter correlated to the voltage of a battery. The reference voltage circuit provides a reference voltage associated with a battery. The voltage/temperature compensation combiner receives the voltage temperature compensation factor. The voltage temperature compensation factor is correlated to the voltage of the battery and the reference voltage. The voltage/temperature compensation combiner utilizes the voltage temperature compensation factor and compares the reference voltage of the battery to the parameter correlated to the voltage of the battery to identify excess battery current. The battery bypass circuit provides a current path for removing excess current from the battery path.

Other objects, features, and advantages of the present invention will become apparent upon reading the following detailed description of the embodiments of the invention, when taken in conjunction with the accompanying drawings and appended claims.

DETAILED DESCRIPTION

Figure 1:
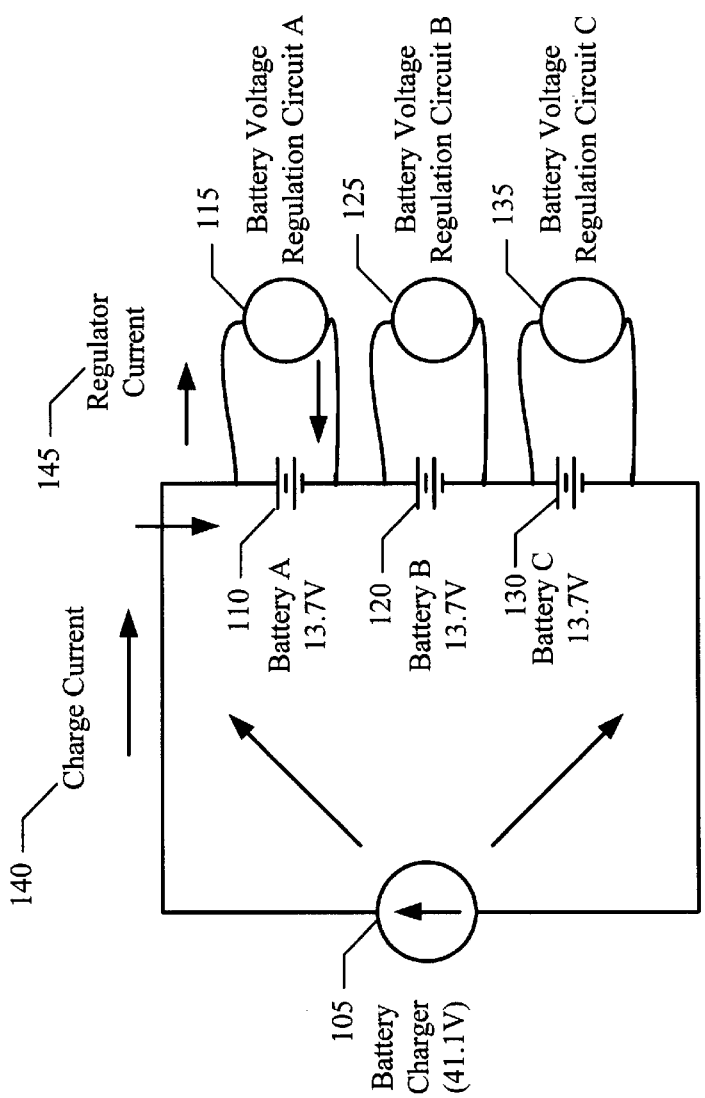
FIG. 1 is a block diagram of an exemplary embodiment of the present invention in an exemplary operating environment.

Referring now to the drawings, in which like numerals refer to like parts throughout the several views, exemplary embodiments of the present invention are described in more detail.

FIG. 1 is an illustration of an exemplary embodiment of the present invention. FIG. 1 shows a battery charging circuit including a plurality of series connected batteries 110, 120, 130 and a plurality of battery voltage regulation circuits 115, 125, 135 connected in parallel with each charging battery 110, 120, 130. Each battery regulation circuit 115, 125, 135 prevents the float voltage across the respective battery 110, 120, 130 from exceeding its optimal float voltage. In a typical charging circuit, a plurality of battery voltage regulation circuits may be used to ensure that each battery charges at an equal voltage. In such a configuration, the battery voltage regulation circuit operates as a battery voltage equalizer. The float voltage is the voltage across a battery 110, 120, 130 while the battery 110, 120, 130 is charging in float mode or trickle mode. A typical battery charger 105 switches from normal charging mode to float mode or trickle mode once the charging battery or batteries 110, 120, 130 reach a full charge. In many systems, the typical operating mode is float mode or trickle mode. This is especially true for systems in which the batteries 110, 120, 130 are used for backup power. In such systems, the batteries 110, 120, 130 are fully charged except at initial start-up and following an interruption in the primary power source. In systems where the batteries are used to provide backup power, it is important that the batteries remain in a state of full charge so that the batteries are ready to provide power to the system until the main power supply is restored.

By preventing any single battery 110, 120, 130 from exceeding its respective optimal float voltage, each of the plurality of batteries 110, 120, 130 remains close to its respective optimal float voltage. This is accomplished because the battery charger 105 regulates the total voltage across the series combination of the batteries. Since no single battery 110, 120, 130 uses more than its share of the available voltage provided by the battery charger 105, each battery 110, 120, 130 is able to receive the fall optimal charging voltage across its terminals.

Figure 2:
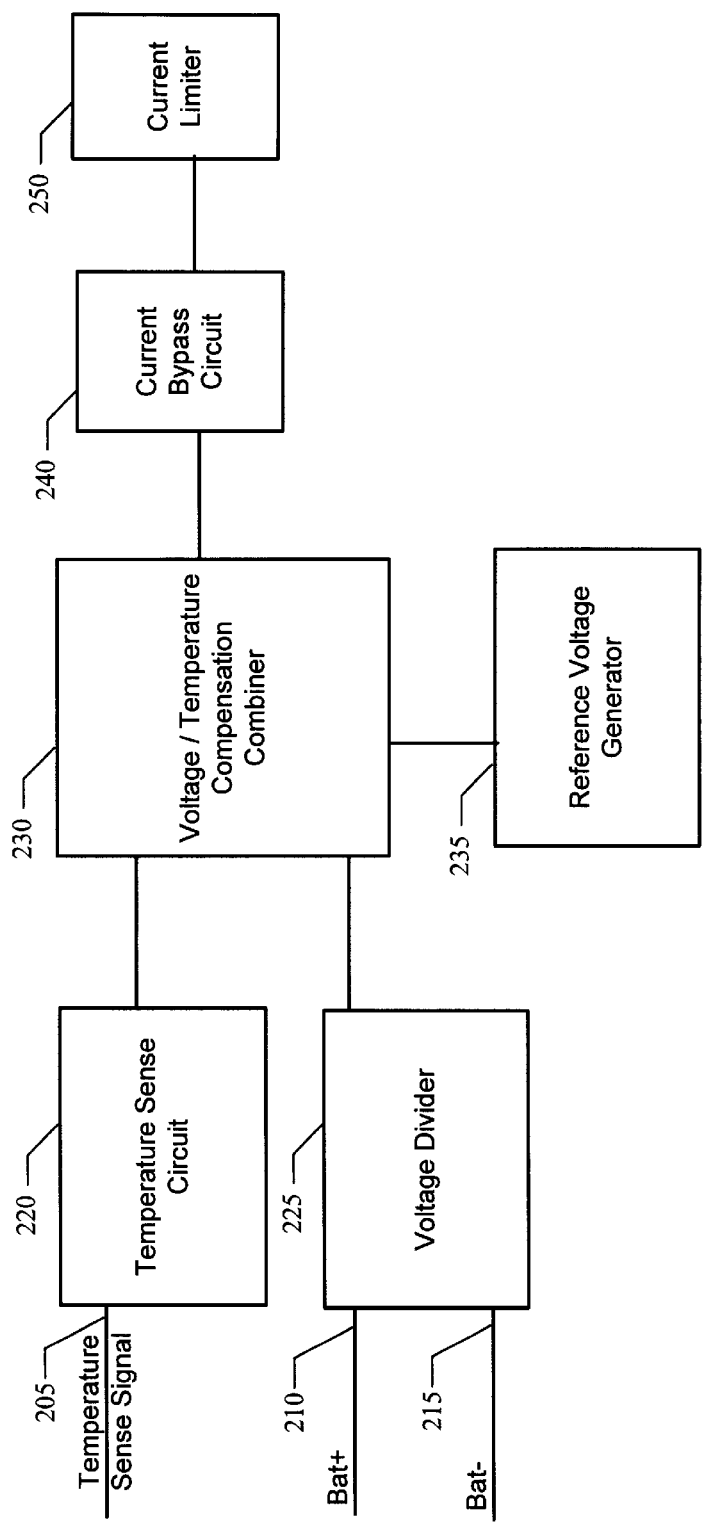
FIG. 2 is a block diagram of a battery voltage regulation circuit in an exemplary embodiment of the present invention.

FIG. 2 is a block diagram of a battery voltage regulation circuit in an exemplary embodiment of the present invention. The battery voltage regulation circuit of the present invention prevents a battery from charging at a voltage above a predetermined charging voltage by monitoring the voltage drop across the charging battery and bypassing excess current when the voltage goes above a predetermined maximum voltage level. In an exemplary embodiment of the present invention, the predetermined maximum voltage level is equal to the optimal float voltage level specified by the manufacturer of the battery.

Figure 3:
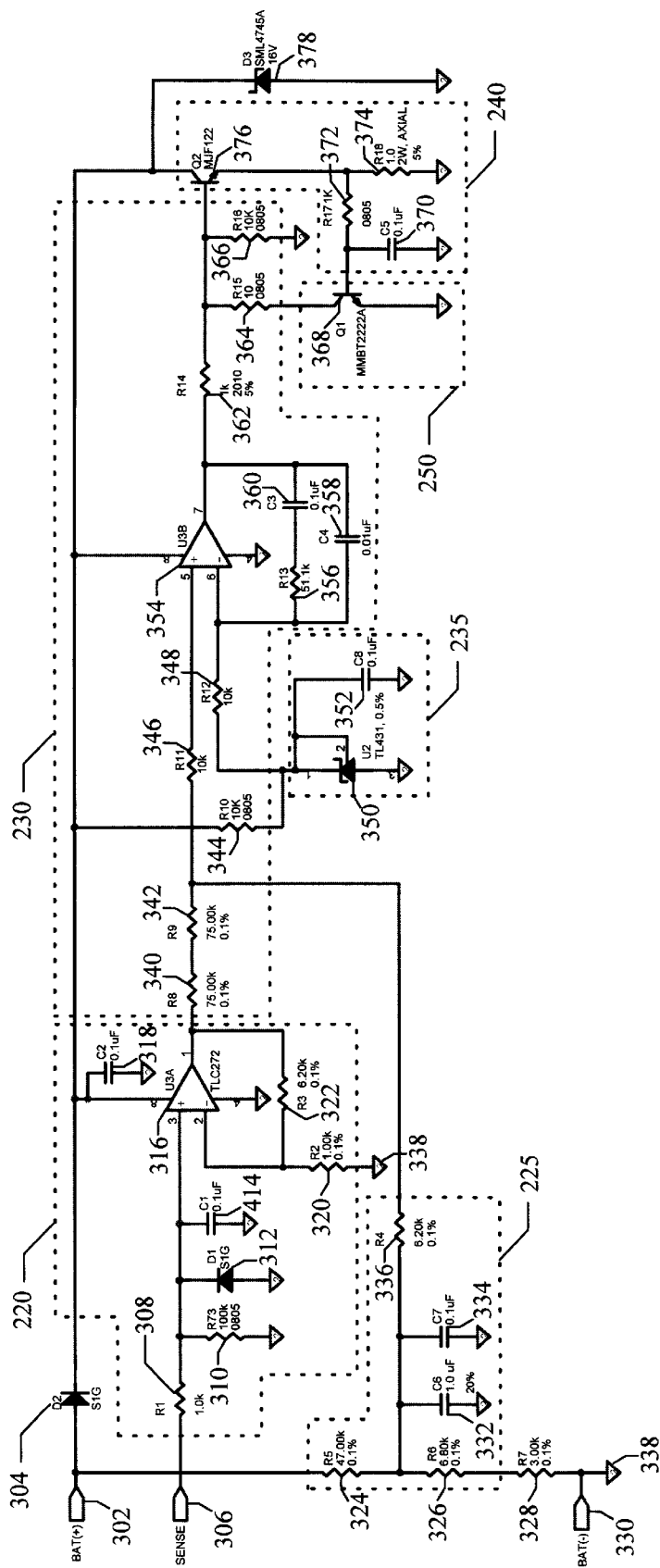
FIG. 3 is a schematic diagram of a battery voltage regulation circuit in an exemplary embodiment of the present invention.

FIG. 3 is a schematic diagram of a battery voltage regulation circuit in an exemplary embodiment of the present invention. FIG. 3 shows an exemplary design of the present invention. Those skilled in the art will understand that the schematic of FIG. 3 is one implementation of the present invention and that numerous alternative implementations are available. Additionally, the component values provided (resistors, capacitors, etc.) are intended to be illustrative of an exemplary operating design of the present invention. Those skilled in the art will understand that the exact component values may need to be adjusted depending on the particular batteries being charged.

FIG. 2 and FIG. 3 will be described together as each FIG. 2 and FIG. 3 illustrate the same circuit in differing levels of detail.

In an exemplary embodiment of the present invention, a battery voltage regulation circuit 115, 125, 135 is installed in parallel with a respective charging battery 110, 120, 130. The voltage regulation circuit 115 inputs the voltage level at the positive terminal 210 and the negative terminal 215 of the battery, and a temperature sensor signal 205. In an exemplary embodiment of the present invention, the battery 110 provides a temperature sense signal 205 indicating the current temperature of the battery 110. Alternatively, a separate temperature sensor may used to monitor the temperature of the battery 110.

In an exemplary embodiment of the present invention, a temperature sense circuit 220 is used to input the temperature sense signal 215. The temperature sense circuit 220 inputs the temperature sense signal 215 and adjusts the voltage to the appropriate voltage range for further processing. The temperature sense signal 205 provides to the temperature sense circuit 220 a parameter indicative of the temperature of the charging battery. In an exemplary embodiment of the present invention, the battery 110, 120, 130 provides a voltage correlated to a desired offset voltage based on the current temperature of the battery. For example, if the manufacturer specifies a float voltage adjustment of 16.2 mV for each °C. change in temperature, the battery 110, 120, 130 may provide a temperature sense signal 205 of 32.4 mV when the battery is 2° C. above the optimal operating temperature. The received temperature sense signal 205 may then be used as received or may be scaled to enable further processing. Alternatively, the battery 110, 120, 130 may provide a temperature sense signal that is not equal to the desired offset voltage. In such alternatives, the temperature sense circuit 220 may be designed to correlate the received signal to the desired offset voltage. The desired offset voltage is correlated to the voltage adjustment specified by the manufacturer for a particular operating temperature of the battery.

In an exemplary embodiment of the present invention, a voltage divider 225 is used to input and scale the positive 210 and negative 215 battery voltage signals. In an exemplary embodiment of the preset invention, the positive 210 and negative 215 battery voltage signals are input by coupling the voltage divider 225 to the positive and negative terminals of the battery. The voltage divider divides the input voltage to adjust the voltage into the appropriate voltage range for further processing. The voltage divider 225 is used because it is preferable to use logic elements that operate at voltages lower than the raw battery input voltages. The input voltage may be divided down to a range where standard transistors may be used as switching elements. Alternatively, the voltage divider may be eliminated and processing may be done using the voltage levels input on the battery inputs 210, 215.

A reference voltage generator 235 is used to generate a reference voltage for comparison against the voltage input from the battery 110. In an exemplary embodiment of the present invention, the reference voltage generator 235, is set to generate the desired operating voltage under normal conditions. The desired operating voltage is generally provided by the manufacturer of the battery 110. Alternatively, a reference voltage may be provided externally and input into a system implementing the present invention. The reference voltage determines the base voltage at which the batteries will charge. The temperature compensated charging voltage is determined from this baseline.

In an exemplary embodiment of the present invention, the reference voltage provided by the reference voltage generator 235 is a scaled equivalent to the desired battery operating voltage. In such an embodiment, the voltage generated is equal to the desired operating voltage divided by the scaling factor equal to the scaling performed on the input battery voltage by the voltage divider 225.

A voltage/temperature compensation combiner 230 is used to compare the input voltage to the reference voltage. Under normal conditions, the voltage/temperature compensation combiner 230 compares the input voltage to the reference voltage to determine whether the present voltage of the battery is above the reference voltage. When the present voltage of the battery is above the reference voltage, a current bypass circuit 240 is used to reduce the voltage across the battery.

In an exemplary embodiment of the present invention, an opamp 354 is used to compare the charging voltage of the battery 110 to the desired charging voltage. The opamp 354 receives the voltage of the battery on a first input and the reference voltage on a second input. In an exemplary embodiment of the present invention, the voltage of the battery is received on the non-inverting input and the reference voltage is received on the inverting input of the opamp 354. When the battery voltage is greater than the reference voltage, the output is driven high.

In addition to comparing the input voltage to the reference voltage, the voltage/temperature compensation combiner 230 adjusts the desired voltage range based on the current operating temperature of the battery. The desired temperature adjustment varies for batteries of different manufacturers. In an exemplary embodiment of the present invention, a temperature signal 306 is received from the battery 110 and converted to a voltage in a desired voltage range. The converted temperature signal 306 is added to the voltage of the battery 302 and compared to the reference voltage generated by the reference voltage generator 235. Alternatively, the temperature signal 306 could be combined with the reference voltage and compared to the battery voltage. In an exemplary embodiment of the present invention, the voltage of the battery 302 and the offset voltage due to temperature are combined by driving both voltages onto a common signal, line 380. The combined signal, the temperature compensated battery voltage, is provided to the non-inverting input of the opamp 354. Thus, the temperature compensated battery voltage is compared to the reference voltage as described above. Alternatively, the temperature offset voltage could be combined with the reference voltage and be compared to the battery voltage.

A current bypass circuit 240 is provided to direct excess charging current away from the charging battery 110. In an exemplary embodiment of the present invention, the current bypass circuit directs excess charging current through a discharge element to ground to dissipate the excess charging current. In an exemplary embodiment of the present invention, the discharge element is a bypass transistor 376. Alternatively, any bypass element capable of discharging excess charging current may be used.

If the battery voltage is greater than the reference voltage, the current bypass circuit 240 is engaged. In an exemplary embodiment of the present invention, the current bypass circuit 240 is engaged by turning on a current bypass transistor 376. Alternatively, any bypass element capable of bypassing and discharging excess battery current may be used in place of the current bypass transistor 376. The current bypass transistor 376 is turned on when it receives a high voltage signal at the base of the current bypass transistor 376. The base of the current bypass transistor 376 receives a signal from the output of the opamp 354. When the voltage of the battery is greater than the reference voltage, the output of the opamp 354 is driven high. This output is provided to the base of the current bypass transistor 376. When the current bypass transistor 376 receives a high signal, it turns on and allows current to flow through the current bypass transistor 376. When the current bypass transistor 376 is turned on, current to the battery is directed through the current bypass transistor 376. In an exemplary embodiment of the current bypass circuit 240, a current bypass transistor 376 is used to discharge excess battery current and a resistor 374 connected to ground 338 is used to sense conducted current. Any size resistor 374 may be used in the present invention, but a low ohm resistor may be preferred as it will appear to be a small load and most of the current will be directed toward the resistor 374. In an exemplary embodiment of the present invention, a 1 ohm resistor 374 is used.

In an exemplary embodiment of the present invention, a current limiter 250 is included to provide over load protection to the current bypass circuit 240. The current limiter 250 monitors the voltage across the sense resistor 374 in the current bypass circuit 240. When the voltage across the sense resistor 374 reaches a predetermined maximum value, the current limiter 250 turns off the current flow through the charging battery regulation circuit. In an exemplary embodiment of the present invention, the voltage across the sense resistor 374 is monitored by feeding the voltage across the sense resistor 374 to the base of a current limiter transistor 368. When the voltage across the sense resistor 374 exceeds a predetermined value, it turns on the current limiter transistor 368. When the current limiter transistor 368 turns on, the output of the opamp 354 that controls the input to the current bypass transistor 376 is pulled low. When the input to the current bypass transistor 376 is pulled low, the current bypass transistor 376 turns off and current stops flowing through the bypass transistor 376. The current limited bypass circuit protects the battery voltage regulation circuit from conducting too much current. If the battery voltage regulation circuit conducts too much current, it may destroy itself.

Thus, it can be seen that an advantageous system and method may be had for providing temperature compensated overcharge protection for charging batteries. The present invention monitors the charge voltage across a charging battery and prevents the charging battery from charging at a voltage level above a predetermined maximum charge level. The present invention also provides temperature compensation for batteries that require different maximum charging voltages at different temperatures.

Alternate embodiments will become apparent to those skilled in the art to which the present invention pertains without departing from its spirit and scope. Accordingly, the scope of the present invention is described by the appended claims and supported by the forgoing description.

What is claimed is:

1. A method of identifying and offloading excess current in a charging circuit which continuously presents current to a battery using a battery voltage regulator, the method comprising:

providing a temperature compensation factor;
providing a predetermined reference voltage;
identifying a charging voltage across a charging battery;
utilizing said temperature compensation factor for comparing said predetermined reference voltage and said charging voltage to identify the presence of excess charging current in a charging system; and
discharging said excess charging current if present.

2. The method of claim 1, wherein the excess charging current is discharged by directing the excess charging current through a bypass element.

3. The method of claim 2, wherein the bypass element is a transistor.

4. The method of claim 1, wherein the excess charging current is directed through a sense resistor.

5. The method of claim 4, further comprising:
monitoring the voltage across said sense resistor; and
turning off the current flow through the battery voltage regulator when the voltage across said sense resistor exceeds a predetermined maximum value.

6. A method of charging a plurality of batteries wherein a first and a second battery are connected in series with a charging element, said method comprising:
providing a first battery voltage regulator connected in parallel with said first battery;
providing a second battery voltage regulator connected in parallel with said second battery;
providing a charging current to a first battery and a second battery;
providing a predetermined reference voltage for each respective battery;
providing a first temperature compensation factor for said first battery;
providing a second temperature compensation factor for said second battery;
identifying a first charging voltage across said first charging battery;
identifying a second charging voltage across said second charging battery;
utilizing said first temperature compensation factor, for comparing said respective predetermined reference voltage and said first charging voltage to identify the presence of a first excess charging current in said first battery;
utilizing said second temperature compensation factor for comparing said respective predetermined reference voltage and said second charging voltage to identify the presence of a second excess charging current in said second battery;
if said first excess charging current is identified, said first excess charging current is discharged; and
if said second excess charging current is identified, said second excess charging current is discharged.

7. The method of claim 6, wherein said first excess charging current is discharged through a first bypass element and said second excess charging current is discharged through a second bypass element.

8. The method of claim 7, wherein said first and second bypass elements are transistors.

9. The method of claim 7, wherein said first excess charging current is directed through a first sense resistor and said second excess charging current is directed through a second sense resistor.

10. The method of claim 9, further comprising the steps of:
monitoring the voltage across said first sense resistor;
monitoring the voltage across said second sense resistor;
turning off the current flow through the first battery voltage regulator when the voltage across said first sense resistor exceeds a predetermined maximum value; and
turning off the current flow through the second battery voltage regulator when the voltage across said second sense resistor exceeds a predetermined maximum value.

11. A system for charging series connected batteries comprising:
a battery charger;
first and second batteries coupled in series with the battery charger;
a first battery voltage regulator circuit coupled in parallel with said first battery;
a second battery voltage regulator circuit coupled in parallel with said second battery; and
wherein each of said battery voltage regulators comprise:
a temperature sense circuit for receiving a parameter correlated to the temperature of a respective battery and for providing a voltage temperature compensation factor correlated to said parameter correlated to the temperature of a respective battery;
a voltage sense circuit for receiving a parameter correlated to the voltage of a respective battery;
a reference voltage associated with a respective battery;
a voltage/temperature compensation combiner for receiving said voltage temperature compensation factor, said parameter correlated to the voltage of a respective battery, and said reference voltage;
said voltage/temperature compensation combiner utilizing said voltage temperature compensation factor for comparing said reference voltage of a respective battery and said parameter correlated to the voltage of said respective battery to identify excess battery current; and
a battery bypass circuit for bypassing said excess battery current from the battery path.

12. A battery voltage regulator for a battery having a temperature comprising:
a temperature sense circuit for receiving a parameter indicative of the temperature of said battery and providing a voltage temperature compensation factor correlated to said parameter indicative of the temperature of said battery;
a battery voltage sense circuit for receiving a parameter indicative of the voltage level of said battery;
a reference voltage for said battery;
a voltage/temperature compensation combiner for receiving said voltage temperature compensation factor, said parameter correlated to the voltage of said battery, and said reference voltage;
said voltage/temperature compensation combiner utilizing said voltage temperature compensation factor for comparing said reference voltage of said battery and said parameter correlated to the voltage of said battery to identify excess battery current; and
a current bypass circuit for directing said excess current away from the battery.

13. The battery voltage regulator of claim 12 further comprising:
a current limiter circuit for limiting the total current in the battery equalizer.

* * * * *